UNITED STATES PATENT OFFICE.

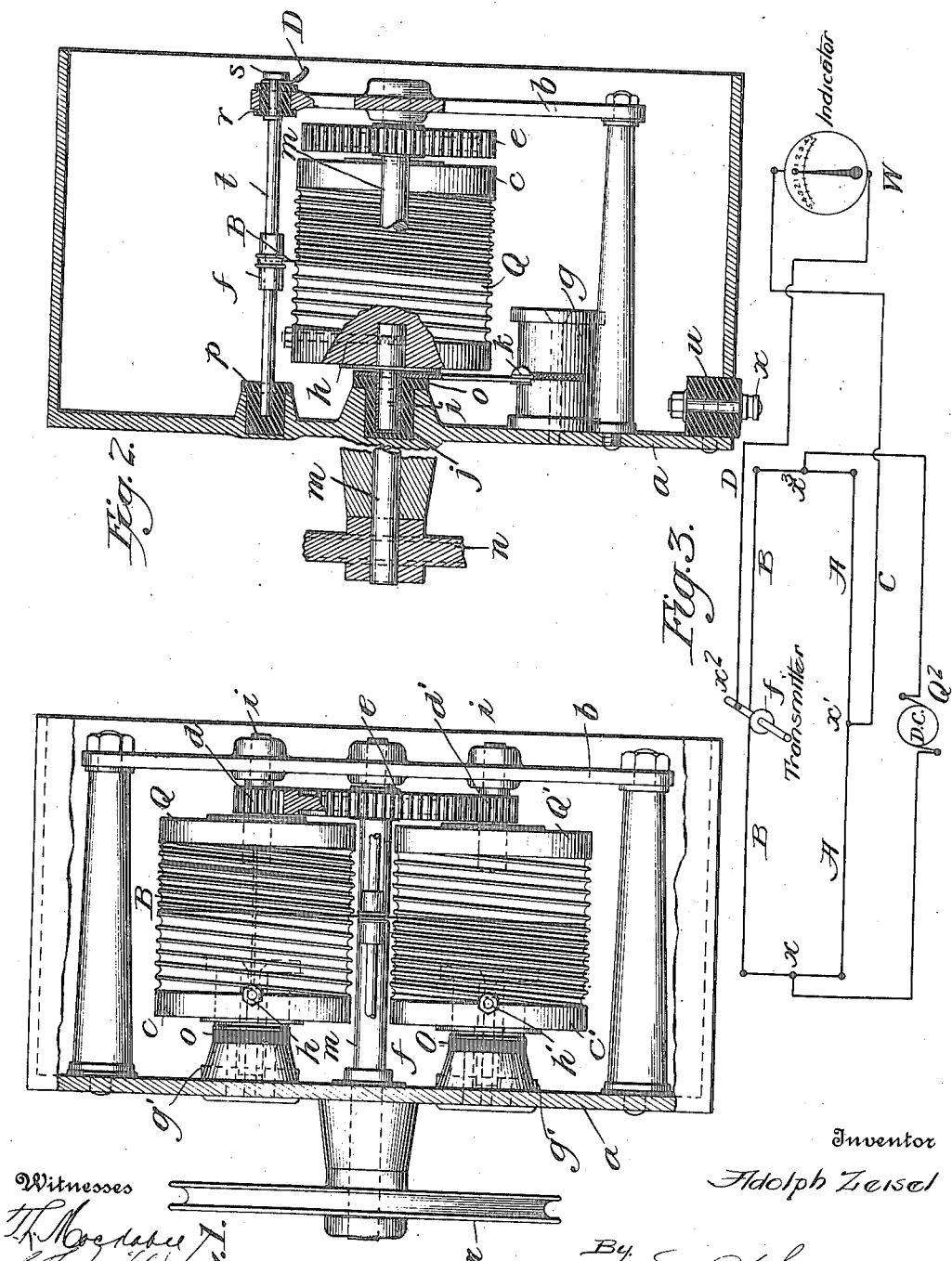

ADOLPH ZEISEL, OF BEL AIR, MARYLAND.

INDICATOR SYSTEM.

1,213,723.  Specification of Letters Patent.  Patented Jan. 23, 1917.

Application filed July 1, 1913, Serial No. 776,825. Renewed June 24, 1916. Serial No. 105,708.

*To all whom it may concern:*

Be it known that I, ADOLPH ZEISEL, a subject of the Austro-Hungarian Empire, and resident of Bel Air, in the county of Harford and State of Maryland, have invented certain new and useful Improvements in Indicator Systems, of which the following is a specification.

My invention relates to an indicator system applicable as an engine telegraph for steam boats; for hydro-electric plants; as water level indicator in dams, reservoirs and tail races; indicator for water wheels; indicator of water levels in stand pipes and reservoirs; to indicate the quantity of gas in gas tanks, and to automatically inform one of the quantity of liquids in tanks at distilleries and breweries. In general any vertical or other movement may be indicated at any distance whatever, and the amount of the movement is noted.

The means for carrying out my invention is exhibited in the accompanying drawings in which like letters or numerals represent like parts.

Figure 1 is a plan of the essential device used in the operation of the invention, partly in section. Fig. 2 is a side elevation partly in central section. Fig. 3 is a diagram of the circuits.

The general nature of the circuits is as follows: The two conductors A and B are of the same length and electrical resistance and are connected to a source $Q^2$ of direct current in parallel.

In the practice of my invention, the conductor A, wound upon grooved spools Q and $Q^1$, as shown in Fig. 1, is tapped at its central point X by the wire C which leads to one post of the indicator W. The conductor B is also wound upon spools Q and $Q^1$, said spools being non-combustible, non-absorbent and non-conductive and are mounted upon shafts $i$, which in turn are equipped with gear wheels $d$ and $d^1$. There is also a driving shaft provided with a gear wheel $e$ that meshes with the gear wheels $d$ and $d^1$, and this shaft $m$ has a pulley $n$, representing the driving power and actuated for example by the rise and fall of a liquid. Or this pulley may be considered as operated by any power whatever. When the shafts $e$ and $e^1$ are rotated by means of the shaft $m$ and the gear wheel $e$, the conductor B is unwound from one of said cylinders and wound upon the other cylinder, or vice versa. At the same time, the conductor B travels over and in contact with the trolley $f$, sliding upon shaft $t$ which forms the second contact for the indicator W through the wire D.

The path of the current through the device seen in Figs. 1 and 2 is from the source of direct current to a common binding post $x$ of conductors A and B, one-half passing through the conductor A to a second common binding post $x^1$ and back to its source. The binding posts $x$, $x^1$ are shown in Fig. 3. The other half passes through the connecting means, shown in Fig. 2 as a conductor H, to the contact sleeve extension K, to the contact sleeve $j$, to the shaft $i$, through the shaft $i$ to the contact screw $h$, through the conductor B wound upon drums Q and $Q^1$ to the second contact screw $h^1$ to the shaft $i^1$, through the shaft $i^1$, to a contact sleeve similar to the sleeve $j$ and through the extension $K^1$ and suitable connecting means to the second common binding post.

The current which passes through the conductors A and B is in equal portions or values, and if the trolley $f$ makes contact at the exact center of the conductor B, as is the case seen in the diagram in Fig. 3, there is no current passing through the indicator W which therefore allows the pointer of the indicator to rest at the zero point. As soon as either portion of the conductor B is lengthened or shortened, by reference to the trolley $f$ over which it travels, the said pointer will for well known electrical reasons move to the right or left and to a distance dependent upon the amount of the current or pressure, assuming that the indicator is an ampere meter or volt-meter. The indicator will show whether the pulley $n$ turns in one direction or the other as it is this pulley that feeds the conductor B over the trolley $f$.

$p$ and $r$ indicate insulator bearings for the shaft $t$ of the sliding trolley $f$. The proper elements should be properly insulated for directing the current according to the circuits in the diagram in Fig. 3. The insulator $o$ shows that, as an illustration, the shafts $i$ of the cylinders Q and $Q^1$ are mounted in contact sleeves $j$, provided with extensions $k$, and are for forming convenient contact terminals for conductor "B." These sleeves are insulated from the bearings and the frame.

I claim as my invention:—

1. In an indicator system, the combination of a source of direct current, a first and second conductor of equal lengths and electrical resistances connected in parallel to said source of direct current, an indicator, an electrical connection between one terminal of said indicator and the center of said first conductor, a sliding trolley wheel bearing on said second conductor normally at its center, an electrical connection between said trolley wheel and the other terminal of said indicator, a pair of non-combustible, non-absorbent, non-conductive drums upon which said second conductor is wound, a pulley, a shaft therefor, and gearing between said shaft and drums for communicating motions to said drums for unwinding said second conductor from one drum and winding it upon the other drum, and causing the said second conductor to pass in either direction and in contact with said sliding trolley wheel.

2. In an indicator system, the combination of a source of direct current, a first and second conductor of equal lengths and electrical resistances connected in parallel with said source of direct current, an indicator, an electrical connection between one terminal of said indicator and the center of said first conductor, a sliding trolley wheel bearing on said second conductor normally at its center, an electrical connection between said trolley wheel and the other terminal of said indicator, a pulley and means controlled by the rotation of said pulley in different directions, for feeding said second conductor back and forth along and in contact with said trolley wheel.

3. In an indicating system, the combination of an indicator, a pair of spaced cylindrical drums each having its peripheral surface provided with spaced annular ribs, a slidably mounted trolley wheel arranged in the space between said drums, a source of current to one terminal of said indicator, a second conductor connected to the remaining terminal of said source of current, said second conductor being coiled around both of the drums and lying between the ribs formed thereon, said trolley wheel being in electrical contact with that portion of the second conductor that bridges the distance between the drums, and a third conductor connecting the remaining terminal of the indicator with the trolley wheel.

4. In an indicator system, the combination of a source of direct current, a first and second conductor of equal length and electrical resistances connected in parallel with said source of direct current, an indicator, an electrical connection between one terminal of said indicator and the center of said first conductor, a movable contact bearing on said second conductor normally at its center, an electrical connection between said contact and the other terminal of said indicator, a pulley or lever, and means controlled by the rotation of said pulley in different directions for feeding said second conductor back and forth along and in engagement with said contact.

Signed at Bel Air, in the county of Harford and State of Maryland, this twenty-first day of June, A. D. 1913.

ADOLPH ZEISEL.

Witnesses:
EDWARD QUARLES,
FRANK H. FULFORD.